US012783542B2

(12) United States Patent
Bollapalli et al.

(10) Patent No.: US 12,783,542 B2
(45) Date of Patent: Nov. 3, 2026

(54) SYSTEMS AND METHODS FOR SEMANTICALLY MAPPING DATA ASSOCIATED WITH A FACILITY

(71) Applicant: Honeywell International Inc., Charlotte, NC (US)

(72) Inventors: Kartikeyan Bollapalli, Bangalore (IN); Ankit Singh, Apex, NC (US); Srihari Narayanaiah, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 18/918,166

(22) Filed: Oct. 17, 2024

(65) Prior Publication Data

US 2026/0111437 A1 Apr. 23, 2026

(51) Int. Cl.
*G06F 16/25* (2019.01)

(52) U.S. Cl.
CPC .................................. *G06F 16/258* (2019.01)

(58) Field of Classification Search
CPC ..................................................... G06F 16/258
See application file for complete search history.

(56) References Cited

U.S. PATENT DOCUMENTS 10,585,933 B2 * 3/2020 Bianchi ............. G06F 16/24557
2003/0037263 A1 * 2/2003 Kamat ................ G06F 21/6227 726/14
2012/0223949 A1 * 9/2012 Whited ................ G06V 30/347 345/441
2021/0374114 A1 * 12/2021 Chen ................... G06F 18/2148
2022/0083528 A1 * 3/2022 Regev ................. G06F 16/2452
2022/0179833 A1 * 6/2022 Ramalingam ......... G06F 16/211
2023/0154017 A1 * 5/2023 Wu ......................... G06T 7/246 382/103

FOREIGN PATENT DOCUMENTS

JP 2002092017 A * 3/2002

OTHER PUBLICATIONS

Manathunga et al., Retrieval Augmented Generation and Representative Vector Summarization for Large Unstructured Textual Data in Medical Education, https://arxiv.org/abs/2308.00479, pp. 1-6. (Year: 2023).*

* cited by examiner

*Primary Examiner* — Cheyne D Ly
(74) *Attorney, Agent, or Firm* — Alston & Bird LLP

(57) ABSTRACT

Various embodiments described herein relate to systems and methods for semantically mapping data associated with a facility. In this regard, initially first vectorial representations of the data in a database are generated. Using the first vectorial representations, a temporary database is created. Then, specifications related to parameters associated with at least one product of the facility is received from a user. The specifications are then converted to second vectorial representations. Further, the second vectorial representations are mapped with the first vectorial representations. Based on the mapping, at least one first vectorial representation is derived from the temporary database. Furthermore, a textual equivalent of the at least one first vectorial representation is rendered via a user interface.

15 Claims, 6 Drawing Sheets

SYSTEMS AND METHODS FOR SEMANTICALLY MAPPING DATA ASSOCIATED WITH A FACILITY

TECHNICAL FIELD

The present disclosure relates generally to management of data in a facility. More particularly, the present disclosure relates to semantically mapping the data associated with the facility.

BACKGROUND

Generally, a facility related to life sciences sector such as a pharmaceutical industry, a medical device company, a healthcare firm, and/or the like is expected to comply with rules and regulations set by appropriate compliance regulatory authorities. Such compliance is often expected to maintain high quality life sciences products and processes in the facility. In view of this, the facility is also required to report data associated with products and processes in the facility to the said authorities. For this, the facility mostly relies on subject matter experts or domain experts to manually create one or more reports using the data associated with products and processes in the facility. However, this has associated challenges. Provided that the facility includes different domains and diverse processes along with numerous product lines, the data associated with products and processes in the facility becomes humongous. Manually handling such humungous data becomes a complicated task. Further, such manual work is often error prone as the experts may fail to accurately scale up to huge volume of data. Due to such errors, some reports may wrongly convey actual meaning of the data leading to non-compliance issues and liabilities (such as heavy penalties) for the facility. Also, such manual work is a time-consuming and costly process leading to inefficient usage of computing and human resources in the facility.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

SUMMARY

Figure 1:
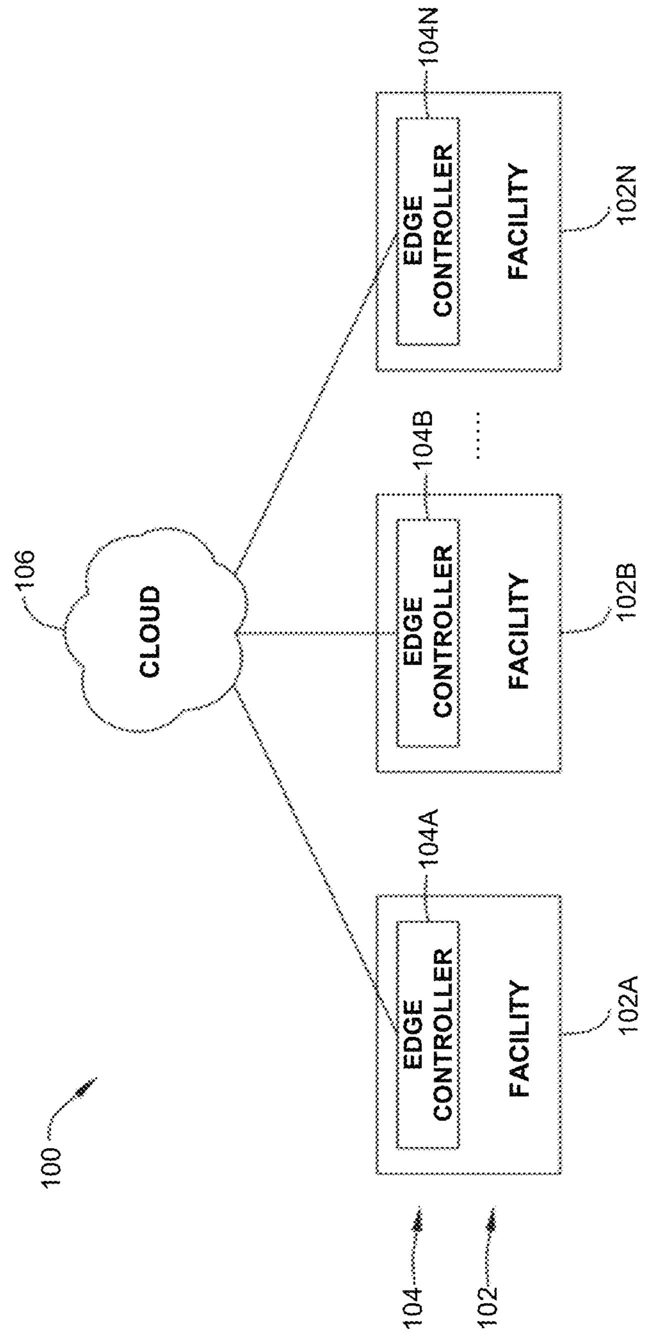
FIG. 1 illustrates a schematic diagram showing an exemplary environment comprising multiple facilities, in accordance with one or more example embodiments described herein.

The details of some embodiments of the subject matter described in this specification are set forth in the accompanying drawings and the description below. Other features, aspects, and advantages of the subject matter will become apparent from the description, the drawings, and the claims.

In accordance with one or more example embodiments of the current disclosure, a method for semantically mapping data associated with a facility is described herein. In this regard, the method comprises generating one or more first vectorial representations of the data associated with the facility in a database. Then, the method comprises creating a temporary database using the one or more first vectorial representations of the data. Further, the method comprises receiving one or more specifications from a user such that the one or more specifications relate to one or more parameters associated with at least one product of the facility. Furthermore, the method comprises converting the one or more specifications into one or more second vectorial representations. The method then comprises mapping the one or more second vectorial representations with the one or more first vectorial representations. Also, the method comprises deriving at least one first vectorial representation from the temporary database based on the mapping. Additionally, the method comprises rendering a textual equivalent of the at least one first vectorial representation via a user interface.

In accordance with another embodiment of the current disclosure, a system for semantically mapping data associated with a facility is described herein. The system comprises a processor and a memory communicatively coupled to the processor, wherein the memory comprises one or more instructions which when executed by the processor, cause the processor to generate one or more first vectorial representations of the data associated with the facility in a database. The processor is also configured to create a temporary database using the one or more first vectorial representations of the data. Further, the processor is also configured to receive one or more specifications from a user. The one or more specifications relate to one or more parameters associated with at least one product of the facility. Furthermore, the processor is also configured to convert the one or more specifications into one or more second vectorial representations. Also, the processor is configured to map the one or more second vectorial representations with the one or more first vectorial representations. Then, the processor is also configured to derive at least one first vectorial representation from the temporary database based on the mapping. Additionally, the processor is also configured to render a textual equivalent of the at least one first vectorial representation via a user interface.

In accordance with yet another embodiment of the current disclosure, a non-transitory, computer-readable storage medium having instructions stored thereon and executable by one or more processors is described herein. In this regard, the instructions when executed by one or more processors cause the one or more processors to generate one or more first vectorial representations of the data associated with the facility in a database. The one or more processors are also configured to create a temporary database using the one or more first vectorial representations of the data. Further, the one or more processors are configured to receive one or more specifications from a user. The one or more specifications relate to one or more parameters associated with at least one product of the facility. Furthermore, the one or more processors are configured to convert the one or more specifications into one or more second vectorial representations. Then, the one or more processors are configured to map the one or more second vectorial representations with the one or more first vectorial representations. Also, the one or more processors are configured to derive at least one first vectorial representation from the temporary database based on the mapping. The one or more processors are also configured to render a textual equivalent of the at least one first vectorial representation via a user interface.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained in the following description and its accompanying drawings.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

DETAILED DESCRIPTION OF THE DRAWINGS

Reference will now be made in detail to embodiments, examples of which are illustrated in the accompanying drawings. In the following detailed description, numerous specific details are set forth in order to provide a thorough understanding of the various described example embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one example embodiment of the present disclosure, and can be included in more than one example embodiment of the present disclosure (importantly, such phrases do not necessarily refer to the same example embodiment).

The word "exemplary" is used herein to mean "serving as an example, instance, or illustration." Any implementation described herein as "exemplary" is not necessarily to be construed as preferred or advantageous over other implementations. If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some example embodiments, or it can be excluded.

More particularly, a facility under life sciences sector often undertakes diverse processes to manufacture several life sciences products such as drug products, medical equipment, chemicals, and/or the like. Such products manufactured at the facility along with the processes are required to comply with certain requirements (such as, but not limited to Good Manufacturing Practice (GMP) regulations) set forth by compliance authorities. In this regard, the compliance authorities expect the facility to provide data associated with products and processes as reports at regular intervals for compliance verification. For example, a pharmaceutical industry may be required to perform annual product quality review (APQR) for drug products it manufactures and provide an APQR report to appropriate regulatory for compliance verification. It is to be noted that the reports are required to cover several quality parameters associated with products and processes in the form of detailed chapters along with visualizations such as graphs, charts, and/or the like. To prepare such reports, the facility often relies either on expertise of technical/subject matter experts or third-party service providers. As it may be understood, the data associated with products and processes in the facility is usually of huge volume as it is generated from diverse processes and numerous product lines. Manually processing such huge volume of data by experts may be subjected to errors as the experts may fail to accurately scale up to such huge volume of data. Also, the experts may fail to appropriately segregate the data and consider all relevant data related to a particular quality parameter from such huge volume of data. This often results in gaps in details presented in few reports. Additionally, this manual work is a cumbersome task. Further, processing such huge volume of data by the third-party service providers also has associated challenges too. Firstly, the data associated with products and processes may comprise information in conventions followed by the facility and the third-party service providers may be unaware or lack knowledge about such conventions. That is, an administrator at a third-party service provider may fail to completely understand schema of the data in a database associated with the facility. Secondly, due to privacy concerns, the third-party service providers may not have complete access to all the data associated with products and processes in the facility. In view of such constraints, some reports prepared by the third-party service providers may fail to meet expectations as set by the compliance authorities. Additionally, it may be required for the facility to provide training to workers at the third-party service provider's end as well. Also, certain reports may wrongly convey details to the compliance authorities leading to non-compliance issues and liabilities (such as heavy penalties) for the facility. With this, reporting the data to compliance authorities becomes a challenging task for the facility.

Thus, to address the above challenges, various example embodiments described herein develop systems and methods for semantically mapping data associated with a facility. In this regard, for instance, the system described herein is configured to incorporate a semantic driven approach to automatically map specifications provided by a user with parameters associated with product(s) and/or process(es) of the facility. Initially, the system described herein receives a request from the user to access the data associated with the facility. This data is often stored in a database associated with the facility while the user may be associated with the facility or an organization providing service to the facility (for instance, a third-party service provider). If one or more attributes in the request meet one or more predefined criteria, the system allows the user to access the data stored in the database i.e., the system grants access to the user. For instance, the one or more attributes may be, but not limited to a role of the user, an organization with which the user is associated, and/or the like. It is to be noted that the data stored in the database comprises one or more data records associated with product(s) and/or process(es) of the facility along with one or more swagger files which include relevant metadata of the one or more data records. Additionally, the data stored in the database also comprises schema of the one or more data records and the database as well. Then, the system described herein generates one or more first vectorial representations of the data in the database. In this regard, the system considers the metadata of the one or more data records along with the schema of the one or more data records and the database to generate the one or more first vectorial representations. As it may be understood, a first vectorial representation of the one or more first vectorial representations corresponds to a numerical equivalent of a respective data record stored in the database. Upon generating such first vectorial representations, the system then creates a temporary database using the one or more first vectorial representations of the data. This temporary database may correspond to a vector database (alternatively referred to as Vector DB).

Then, the system receives one or more specifications from the user (say, via a user interface) such that the one or more specifications relate to one or more parameters associated with at least one product of the facility. Additionally, the one or more parameters may also relate to one or more processes undertaken at the facility. The said parameters generally correspond to quality parameters that may be, but not limited to product identifier, product name, process name, product recall status, geographical location, supply chain status of product, complaint associated with product, category of product, and/or the like. The one or more specifications may be provided by the user in view of creating one or more reports that are often used to meet compliance standards as set forth by relevant compliance authorities. Further, the system converts the one or more specifications into one or more second vectorial representations. As it may be understood, a second vectorial representation of the one or more second vectorial representations corresponds to a numerical equivalent of a respective specification of the one or more specifications. Upon conversion of the one or more specifications to the one or more second vectorial representations, the system then maps the one or more second vectorial representations with the one or more first vectorial representations. In this regard, the system considers semantic meaning of vectors while mapping appropriate vectors. The semantic meaning of vectors is often considered in light of the metadata of the one or more data records along with the schema of the one or more data records and the database. For example, an administrator from an organization (corresponding to a third-party service provider hired by the facility) may provide one specification as 'batch number'. This specification 'batch number' may be then converted to a second vectorial representation and mapped with one or more first vectorial representations in a temporary database. The one or more first vectorial representations may comprise vectorial representations of data records such as 'lot number' and 'series number' in a database. Considering metadata associated with 'lot number' and 'series number' along with schema of the database, the system may map vectorial representation of 'batch number' with vectorial representation of 'series number' in view of semantic meaning of vectors. Such mapping is done as metadata associated with 'series number' conveys a meaning similar to 'batch number'. Accordingly, the system described herein vectorially maps the one or more specifications with a best match considering semantic meaning into account.

Further, the system derives at least one first vectorial representation from the temporary database based on the mapping. That is, the system considers the best match for each of the one or more specifications and derives at least one first vectorial representation from the temporary database. Continuing the above example, the system may derive a first vectorial representation of 'series number' from the temporary database which is the best match for 'batch number'. Also, the system described herein provides one or more data values (numerical values, textual representations, and/or the like) associated with each of the one or more specifications from corresponding data records in the database. Upon deriving the at least one first vectorial representation, the system also makes sure to render a textual equivalent of the at least one first vectorial representation via the user interface. That is, continuing the same example, the system renders 'series number' which corresponds to a textual equivalent of the at least one first vectorial representation on the user interface. Such rendering facilitates the user to view textual equivalents which are mapped by the system and to provide feedback, if any. With such feedback, the system learns over a period of time to improve accuracy of mapping. Then, considering such textual equivalents and data values, the system also automatically creates one or more reports that is required to be reported to appropriate compliance authorities. Additionally, the system also assists the user to create one or more reports by providing said textual equivalents and data values.

Accordingly, the system described herein facilitates accurate mapping of the data associated with the facility thereby eliminating potential errors caused due to manual data processing. Also, provided that the system semantically maps specifications provided by the user with data records, the user need not have complete knowledge about conventions followed by the facility and schema associated with database(s) of the facility as well. This significantly saves time required to train users especially, associated with third-party service providers. Additionally, mappings provided by the system facilitate creation of one or more reports with accurate information thereby eliminating non-compliance issues due to inaccurate data reporting to appropriate compliance authorities.

FIG. 1 illustrates a schematic diagram showing an exemplary environment comprising multiple facilities. According to various example embodiments described herein, an exemplary environment 100 comprises one or more facilities 102*a*, 102*b*, . . . 102*n* (collectively "facilities 102"). In some example embodiments, a facility of the one or more facilities 102*a*, 102*b*, . . . 102*n* may correspond to, for example, a building, a factory, a pharmaceutical industry, an industrial plant, and/or the like related to life sciences sector. In some example embodiments, the one or more facilities 102*a*, 102*b*, . . . 102*n* in the illustrative environment 100 may be of same type. In some example embodiments, the one or more facilities 102*a*, 102*b*, . . . 102*n* in the illustrative environment 100 may be of different type. As it may be understood, in some example embodiments described herein, a facility of the one or more facilities 102*a*, 102*b*, . . . 102*n* often manufactures several life sciences products such as drug products, medical equipment, chemicals, and/or the like. In this regard, the facility often incorporates several diverse processes to manufacture such life sciences products. Such products manufactured at the facility along with the associated processes are expected to meet standards as set forth by one or more compliance authorities. Per this aspect, the facility is required to report data associated with the products along with the processes to appropriate compliance authorities in a timely manner. For example, a pharmaceutical industry may be required to perform annual product quality review (APQR) for a drug product it manufactures and provide an APQR report to appropriate compliance authority annually. In view of reporting the data to authorities, the facility often maintains a storage say, a database in order to store the data associated with the products along with the processes. It is to be noted that the facility is required to selectively report some portions of the data to appropriate compliance authority as a part of reporting the data. Said alternatively, the facility need not report all of the data to appropriate compliance authority but only report those portions of the data based on requirement(s). Provided that the data associated with the products and the processes is of substantial volume, it becomes essential to accurately select relevant portions of the data and report it to appropriate compliance authority to avoid non-compliance issues.

In some example embodiments, a cloud 106 is operably coupled with one or more facilities 102*a*, 102*b*, . . . 102*n*, meaning that communication between the cloud 106 and one or more facilities 102*a*, 102*b*, . . . 102*n* is enabled. The cloud 106 may represent distributed computing resources, software, platform or infrastructure services which can enable data handling, data processing, data management, and/or analytical operations on the data exchanged & transacted in the facilities 102. In some example embodiments described herein, the cloud 106 represents a platform that comprises one or more services to semantically map the data associated with the facility. Per this aspect, the one or more services of the cloud 106 appropriately handle, process, and/or manage the data at the cloud 106 to facilitate mapping of the data associated with the facility using a semantic driven approach. In this regard, the data at the cloud 106 comprises one or more data records which comprise information related to product(s) and/or process(es) of the facility. For example, some data records may comprise quality parameters associated with certain products while some other data records may comprise process parameters associated with certain processes. Additionally, the data at the cloud 106 comprises one or more swagger files which include relevant metadata of the one or more data records along with a schema of the one or more data records and a schema of the database. Also, the cloud 106 may include or generate models required to handle, process, and/or manage the data in order to facilitate mapping of the data associated with the facility using a semantic driven approach. In some example embodiments, the cloud 106 includes one or more servers that may be programmed to communicate with the one or more facilities 102*a*, 102*b*, . . . 102*n* and to exchange data as appropriate. The cloud 106 may be a single computer server or may include a plurality of computer servers. In some example embodiments, the cloud 106 may represent a hierarchal arrangement of two or more computer servers, where perhaps a lower-level computer server (or servers) processes the data, for example, while a higher-level computer server oversees operation of the lower-level computer server or servers.

Each of the facilities 102 may include a variety of different processes with regards to manufacturing life sciences products. For example, in a facility such as a pharmaceutical industry, there may be several processes related to research and development, material handling, shipping, quality assurance, law/legal, and/or the like associated with manufacturing of a drug product. In view of such diversity, the data related to product(s) and/or process(es) also becomes diverse. Accordingly, volume of the data associated with the products along with the processes becomes relatively substantial and complex in nature. For example, a data record may comprise batch number of a drug product while another related data record may comprise recall history of related drug products. In another example, a data record may comprise a geographical region where a drug product is manufactured while another related data record may comprise process parameters associated with manufacturing of the drug product. In the example shown in FIG. 1, each of the one or more facilities 102*a*, 102*b*, . . . 102*n* includes a respective edge controller (alternatively, edge gateway) 104*a*, 104*b*, . . . 104*n* (collectively "edge controllers 104" or "edge gateways 104"). In some example embodiments, each of one or more edge controllers 104*a*, 104*b*, . . . 104*n* is configured to receive the data from the respective facilities 102. In some examples, the one or more edge controllers 104*a*, 104*b*, . . . 104*n* may operate as intermediary node to transact the data between the facilities 102 and/or the cloud 106. In this regard, the data transacted comprises the one or more data records having all relevant information associated with product(s) and/or process(es) in the facility along with appropriate swagger files and related schemas. In some examples, each of the one or more edge controllers 104*a*, 104*b*, . . . 104*n* is capable of receiving the data from disparate data sources e.g., but not limited to, in different data formats and/or using various data communication protocols, from the facilities 102. In this regard, each of the one or more edge controllers 104*a*, 104*b*, . . . 104*n* can receive & filter the data and translate the data into a common language and/or format (e.g. normalized data) for subsequent communication to the cloud 106. The common language and/or format may be compatible with and expected by the cloud 106.

Figure 2:
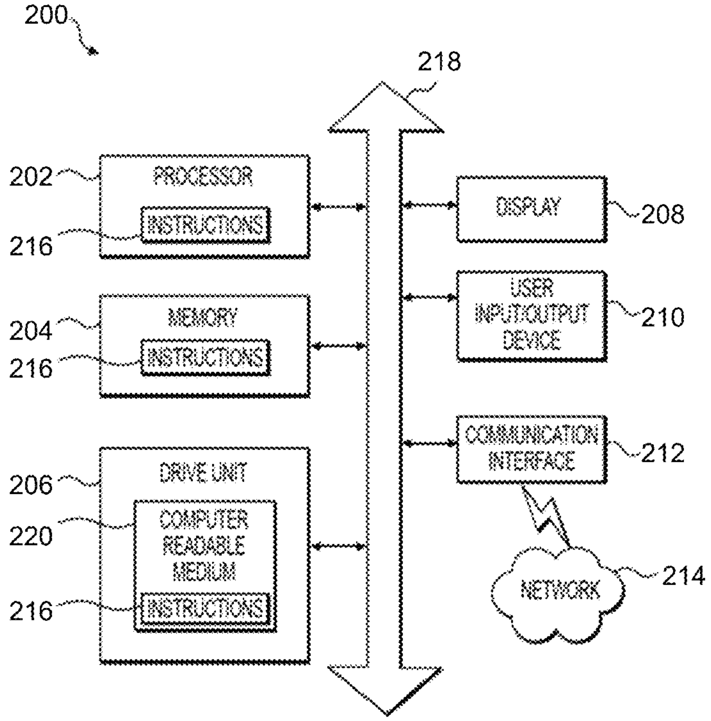
FIG. 2 illustrates a schematic diagram showing an implementation of a controller that may execute techniques in accordance with one or more example embodiments described herein.

FIG. 2 illustrates a schematic diagram showing an implementation of a controller that may execute techniques in accordance with one or more example embodiments described herein. In one or more example embodiments, controller 200 described herein may include a set of instructions that can be executed to cause the controller 200 to perform any one or more of the methods or computer-based functions disclosed herein. The controller 200 may operate as a standalone device or may be connected, e.g., using a network, to other computer systems or peripheral devices.

In a networked deployment, the controller 200 may operate in the capacity of a server or as a client in a server-client user network environment, or as a peer computer system in a peer-to-peer (or distributed) network environment. The controller 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 200 can be implemented using electronic devices that provide voice, video, or data communication. Further, while the controller 200 is illustrated as a single system, the term "system" shall also be taken to include any collection of systems or sub-systems that individually or jointly execute a set, or multiple sets, of instructions to perform one or more computer functions.

As illustrated in FIG. 2, the controller 200 may include a processor 202, e.g., a central processing unit (CPU), a graphics processing unit (GPU), or both. The processor 202 may be a component in a variety of systems. For example, the processor 202 may be part of a standard computer. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The controller 200 may include a memory 204 that can communicate via a bus 218. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 204 includes a cache or random-access memory for the processor 202. In alternative implementations, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the processor 202 executing the instructions stored in the memory 204. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the controller 200 may further include a display 208, such as a liquid crystal display (LCD), an organic light emitting diode (OLED), a flat panel display, a solid-state display, a cathode ray tube (CRT), a projector, a printer or other now known or later developed display device for outputting determined information. The display 208 may act as an interface for the user to see the functioning of the processor 202, or specifically as an interface with the software stored in the memory 204 or in the drive unit 206. Additionally or alternatively, the controller 200 may include an input/output device 210 configured to allow a user to interact with any of the components of controller 200. The input/output device 210 may be a number pad, a keyboard, or a cursor control device, such as a mouse, or a joystick, touch screen display, remote control, or any other device operative to interact with the controller 200. The controller 200 may also or alternatively include drive unit 206 implemented as a disk or optical drive. The drive unit 206 may include a computer-readable medium 220 in which one or more sets of instructions 216, e.g. software, can be embedded. Further, the instructions 216 may embody one or more of the methods or logic as described herein. The instructions 216 may reside completely or partially within the memory 204 and/or within the processor 202 during execution by the controller 200. The memory 204 and the processor 202 also may include computer-readable media as discussed above.

In some systems, a computer-readable medium 220 includes instructions 216 or receives and executes instructions 216 responsive to a propagated signal so that a device connected to a network 214 can communicate voice, video, audio, images, or any other data over the network 214. Further, the instructions 216 may be transmitted or received over the network 214 via a communication port or interface 212, and/or using a bus 218. The communication port or interface 212 may be a part of the processor 202 or may be a separate component. The communication port or interface 212 may be created in software or may be a physical connection in hardware. The communication port or interface 212 may be configured to connect with a network 214, external media, the display 208, or any other components in controller 200, or combinations thereof. The connection with the network 214 may be a physical connection, such as a wired Ethernet connection or may be established wirelessly as discussed below. Likewise, the additional connections with other components of the controller 200 may be physical connections or may be established wirelessly. The network 214 may alternatively be directly connected to a bus 218.

While the computer-readable medium 220 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 220 may be non-transitory, and may be tangible. The computer-readable medium 220 can include a solid-state memory such as a memory card or other package that houses one or more non-volatile read-only memories. The computer-readable medium 220 can be a random-access memory or other volatile re-writable memory. Additionally or alternatively, the computer-readable medium 220 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 200 may be connected to a network 214. The network 214 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 214 may include wide area networks (WAN), such as the Internet, local area networks (LAN), campus area networks, metropolitan area networks, a direct connection such as through a Universal Serial Bus (USB) port, or any other networks that may allow for data communication. The network 214 may be configured to couple one computing device to another computing device to enable communication of data between the devices. The network 214 may generally be enabled to employ any form of machine-readable media for communicating information from one device to another. The network 214 may include communication methods by which information may travel between computing devices. The network 214 may be divided into sub-networks. The sub-networks may allow access to all of the other components connected thereto or the sub-networks may restrict access between the components. The network 214 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof. It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 3:
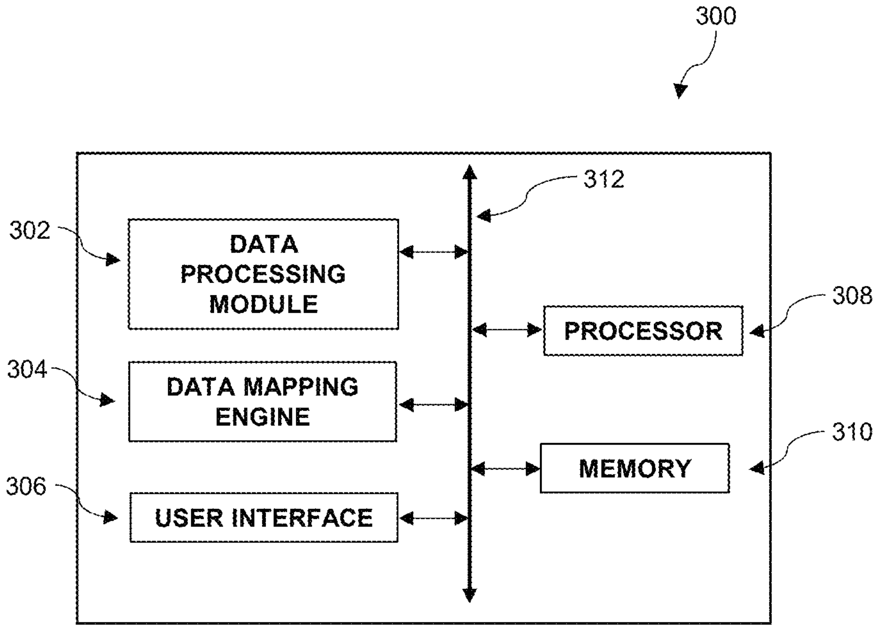
FIG. 3 illustrates a schematic diagram showing an implementation of an exemplary data mapping system, in accordance with one or more example embodiments described herein.

FIG. 3 illustrates a schematic diagram showing an implementation of an exemplary data mapping system, in accordance with one or more example embodiments described herein. In one or more example embodiments, the data mapping system 300 described herein incorporates a semantic driven approach to automatically map specifications provided by a user with parameters associated with product(s) and/or process(es) of a facility (for instance, one or more facilities 102*a*, 102*b*, . . . 102*n* as described in FIG. 1 of the current disclosure). In this regard, the data mapping system 300 initially generates one or more first vectorial representations of data in a database associated with the facility. The data in the database comprises one or more data records associated with product(s) and/or process(es) of the facility along with one or more swagger files and respective schema associated with the one or more data records and the database. Using the one or more first vectorial representations, the data mapping system 300 creates a temporary database which may correspond to a vector database (alternatively referred to as Vector DB). The data mapping system 300 also receives one or more specifications from the user (say, via a user interface). The one or more specifications relate to one or more parameters associated with product(s) and/or process(es) of the facility. The data mapping system 300 then converts the one or more specifications into one or more second vectorial representations. Then, the data mapping system 300 maps the one or more second vectorial representations with the one or more first vectorial representations. In this regard, the data mapping system 300 considers semantic meaning of vectors while mapping appropriate vectors. The data mapping system 300 then identifies a best matching first vectorial representation for each of the one or more second vectorial representations based on the mapping. That is, the data mapping system 300 derives at least one first vectorial representation from the temporary database based on the mapping. Upon deriving the at least one first vectorial representation, the data mapping system 300 also makes sure to render a textual equivalent of the at least one first vectorial representation via the user interface.

In some example embodiments, the data mapping system 300 is a server system (e.g., a server device) that facilitates a data analytics platform between one or more computing devices, one or more data sources, and/or one or more facilities. In some example embodiments, the data mapping system 300 is a device with one or more processors and a memory. Also, in some example embodiments, the data mapping system 300 is implementable via the cloud 106. The data mapping system 300 is implementable in one or more facilities related to one or more technologies, for example, but not limited to, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, life science technologies, process plant technologies, procurement technologies, and/or one or more other technologies.

In some example embodiments, the data mapping system 300 comprises one or more components such as, a data processing module 302, a data mapping engine 304, and/or a user interface 306. Additionally, in one or more example embodiments, the data mapping system 300 comprises a processor 308 and/or a memory 310. In one or more example embodiments, one or more components of the data mapping system 300 may be communicatively coupled to the processor 308 and/or the memory 310 via a bus 312. In certain example embodiments, one or more aspects of the data mapping system 300 (and/or other systems, apparatuses and/or processes disclosed herein) constitute executable instructions embodied within a computer-readable storage medium (e.g., the memory 310). For instance, in an example embodiment, the memory 310 stores computer executable component and/or executable instructions (e.g., program instructions). Furthermore, the processor 308 facilitates execution of the computer executable components and/or the executable instructions (e.g., the program instructions). In an example embodiment, the processor 308 is configured to execute instructions stored in the memory 310 or otherwise accessible to the processor 308.

The processor 308 is a hardware entity (e.g., physically embodied in circuitry) capable of performing operations according to one or more embodiments of the disclosure. Alternatively, in an example embodiment where the processor 308 is embodied as an executor of software instructions, the software instructions configure the processor 308 to perform one or more algorithms and/or operations described herein in response to the software instructions being executed. In an example embodiment, the processor 308 is a single core processor, a multi-core processor, multiple processors internal to the data mapping system 300, a remote processor (e.g., a processor implemented on a server), and/or a virtual machine. In certain example embodiments, the processor 308 is in communication with the memory 310, the data processing module 302, the data mapping engine 304, and/or the user interface 306 via the bus 312 to, for example, facilitate transmission of data between the processor 308, the memory 310, the data processing module 302, the data mapping engine 304, and/or the user interface 306. In some example embodiments, the processor 308 may be embodied in a number of different ways and, in certain example embodiments, includes one or more processing devices configured to perform independently. Additionally or alternatively, in one or more example embodiments, the processor 308 includes one or more processors configured in tandem via bus 312 to enable independent execution of instructions, pipelining of data, and/or multi-thread execution of instructions.

The memory 310 is non-transitory and includes, for example, one or more volatile memories and/or one or more non-volatile memories. In other words, in one or more example embodiments, the memory 310 is an electronic storage device (e.g., a computer-readable storage medium). The memory 310 is configured to store information, data, content, one or more applications, one or more instructions, or the like, to enable the data mapping system 300 to carry out various functions in accordance with one or more embodiments disclosed herein. In accordance with some example embodiments described herein, the memory 310 may correspond to an internal or external memory of the data mapping system 300. In some examples, the memory 310 may correspond to a database communicatively coupled to the data mapping system 300. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor circuitry, an executable component, a thread of instructions, a program, and/or a computer entity.

In one or more example embodiments, the data processing module 302 initially receives a request from the user to access the data associated with the facility. The request may be received via a computing device (not shown) associated with the user and/or the user interface 306. Per this aspect, the request may be received in the form of text and/or audio via the computing device and/or the user interface 306. It is to be noted that the user may correspond to personnel of the facility and/or an employee of an organization different from the facility (for example, a third-party service provider hired by the facility). The request provided by the user is often characterized by attributes such as a role of the user, an organization with which the user is associated, and/or the like. The data processing module 302 then checks if the request comprises one or more attributes. Further, the data processing module 302 verifies if the one or more attributes in the request meet one or more predefined criteria. If the one or more attributes meet the one or more predefined criteria, the data processing module 302 grants the access to the user. The one or more predefined criteria may be defined based on processes in the facility, hierarchy of users in the facility, an organization with which users are associated, and/or the like. The data processing module 302 performs such verification to selectively provide the access to authentic users only and protect privacy of the data.

In one or more example embodiments described herein, the data processing module 302 generates one or more first vectorial representations of the data associated with the facility. This data is often stored in a database associated with the facility. And the data comprises the one or more data records associated with product(s) and/or process(es) of the facility. For example, a data record may comprise a batch number as a quality parameter associated with a product. In another example, a data record may comprise a shipment status as a process parameter associated with supply chain process for a product. Yet in another example, a data record may comprise recall history of a group of similar or related products. In this regard, the one or more data records comprise all relevant information (as numerical values, text, and/or the like) associated with the products along with the processes in the facility. Additionally, the data associated with the facility comprises one or more swagger files and respective schema associated with the one or more data records and the database as well. The one or more swagger files generally comprise relevant metadata of the one or more data records. The metadata may be characterized by parameter present in a data record along with a description about said data record. For example, for a data record having batch number of a drug product, metadata in a swagger file may be characterized by 'batch number' which corresponds to parameter along with a short description about the drug product with a date and a timestamp. In another example, for a data record having recall history of a group of related products, metadata in a swagger file may be characterized by those parameters which led to product recall along with a description of issue that led to product recall. It is to be noted that at times the one or more swagger files may be exposed to the user to facilitate mapping of the data. Further, a schema associated with the one or more data records comprises a representation of how information is arranged in the one or more data records while a schema associated with the database comprises a representation of how the data is arranged in the database and how the database is constructed. It is to be appreciated that the facility maintains the data in the database by regularly updating the database with appropriate datasets associated with product(s) and/or process(es) of the facility. Considering such data, the data processing module 302 generates the one or more first vectorial representations. In this regard, the data processing module 302 converts one or more textual representations in respective data records to one or more numerical representations. Also, the data processing module 302 may rely on known techniques such as, but not limited to Word2Vec and/or the like to convert textual representations into numerical representations. As it may be understood, a first vectorial representation of the one or more first vectorial representations corresponds to a numerical equivalent of a respective data record. It is also to be noted that the conversion of the one or more textual representations in respective data records to the one or more numerical representations is based on metadata of the one or more data records along with schemas of the one or more data records and the database.

Further, in one or more example embodiments, the data processing module 302 creates a temporary database using the one or more first vectorial representations of the data. This temporary database may correspond to a vector database (alternatively referred to as Vector DB) which comprises the one or more first vectorial representations of the data. Then, in one or more example embodiments described herein, the data processing module 302 receives one or more specifications from the user. In this regard, the one or more specifications relate to one or more parameters associated with at least one product of the facility. Also, the one or more specifications relate to one or more parameters associated with at least one process in the facility as well. The one or more specifications may be received via the computing device associated with the user and/or the user interface 306. Per this aspect, the one or more specifications may be received in the form of text and/or audio via the computing device and/or the user interface 306. It is to be noted that the one or more specifications may be provided by the user in view of creating one or more reports. Such reports are often used to timely report data or details related to product(s) and/or process(es) to relevant compliance authorities so as to meet one or more compliance regulations. At times, the user may not be aware of or may lack complete knowledge on how the data is stored in the database, how information is represented in data records, interrelationships between data records, naming conventions used in data records, and/or the like. While preparing such reports that are to be provided to relevant compliance authorities, details presented in the reports should be of utmost accuracy. In this regard, lack of awareness or lack of knowledge of the user should not affect accuracy of details presented in the reports. So instead of the user manually searching for required information in the database, the data mapping system 300 described herein allows the user to provide the one or more specifications based on specific requirements say, for creation of the one or more reports. Then, the data mapping system 300 analyzes the one or more specifications to relate context of the one or more specifications with relevant data in the database, and automatically fetches relevant information (numerical values, textual representations, and/or the like) from the database. The one or more specifications received at the data processing module 302 of the data mapping system 300 often comprises the one or more parameters which correspond to one or more quality parameters and/or one or more process parameters. In this regard, the one or more parameters may be, but not limited to a product identifier, a product name, a process name, a product recall status, a geographical location, a supply chain status of a product, a complaint associated with a product, a category of a product, and/or the like. For example, a user such as an administrator may be required to create a report for reporting information related to a drug product in view of annual product quality review (APQR). In this regard, the administrator may be required to include details such as batch number, geographical region of the facility, a category under which the drug product falls, and recall history of other related products in the report. So, the administrator may provide batch number, geographical region of the facility, a category under which the drug product falls, and recall history of other related products as specifications to the data mapping system 300.

In one or more example embodiments described herein, the data processing module 302 of the data mapping system 300 converts the one or more specifications into one or more second vectorial representations. In this regard, the data processing module 302 converts one or more textual representations in respective specifications to one or more numerical representations. Also, the data processing module 302 may rely on known techniques such as, but not limited to Word2Vec and/or the like to convert textual representations into numerical representations. As it may be understood, a second vectorial representation of the one or more second vectorial representations corresponds to a numerical equivalent of a respective specification of the one or more specifications. The one or more second vectorial representations may also be stored in the temporary database as well. Then, in one or more example embodiments, the data mapping engine 304 maps the one or more second vectorial representations with the one or more first vectorial representations. While mapping, the data mapping engine 304 considers semantic meaning of appropriate vectors (that is, of both first vectorial representations and second vectorial representations). For example, while mapping a first vectorial representation with a second vectorial representation, the data mapping engine 304 considers semantic meaning of the first vectorial representation as well as of the second vectorial representation. Often, the data mapping engine 304 considers semantic meaning of vectorial representations in view of the metadata of the one or more data records along with respective schemas of the one or more data records and the database. Additionally, the data mapping engine 304 considers semantic meaning of vectorial representations in view of the context of the one or more specifications as well. For example, an administrator from an organization (corresponding to a third-party service provider hired by the facility) may provide one specification as 'batch number'. This specification 'batch number' may be then converted to a second vectorial representation. The data mapping engine 304 maps the second vectorial representation corresponding to 'batch number' with at least some first vectorial representations in a temporary database. The at least some first vectorial representations may comprise vectorial representations of data records such as 'lot number' and 'series number' in a database. It is to be noted that 'batch number' provided by the administrator may not be exactly found as 'batch number' in data records of the database and so in the temporary database as well. One reason might be that the term 'batch number' may not be the convention followed by the facility. Considering metadata associated with 'lot number' and 'series number' along with schema of the database, the data mapping engine 304 may determine that the specification 'batch number' is closely mapping to 'series number'. In this regard, the data mapping engine 304 may map vectorial representation of 'batch number' with vectorial representation of 'series number' in view of semantic meaning of vectors. Such mapping is done as metadata associated with 'series number' conveys a meaning similar to 'batch number' and 'series number' is the closest match to 'batch number'. Accordingly, the data mapping engine 304 vectorially maps the one or more specifications with a best match in the temporary database considering semantic meaning into account.

Furthermore, in one or more example embodiments described herein, the data mapping engine 304 derives at least one first vectorial representation from the temporary database based on the mapping. That is, the data mapping engine 304 considers the best match for each of the one or more specifications and derives at least one first vectorial representation from the temporary database. In this regard, the data mapping engine 304 automatically fetches the closest match in the temporary database and so in the data in the database for each of the one or more specifications provided by the user. Continuing the above example, the data mapping engine 304 may derive a first vectorial representation of 'series number' from the temporary database which is the best match for 'batch number'. Additionally, it is also to be noted that the data mapping engine 304 described herein fetches relevant information (numerical values, textual representations, and/or the like) for each of the one or more specifications from corresponding data records in the database that are mapped as well. Additionally, in one or more example embodiments described herein, the user interface 306 renders a textual equivalent of the at least one first vectorial representation as well. The textual equivalent of the at least one first vectorial representation is fetched from the database considering information in a corresponding data record along with its metadata. The textual equivalent may also include numerical values fetched from the database considering information in a corresponding data record along with its metadata as well. That is, continuing the same example, the system renders 'series number' which corresponds to a textual equivalent of the at least one first vectorial representation on the user interface. It is to be appreciated that the textual equivalent rendered on the user interface 306 facilitates the user to provide feedback regarding the textual equivalent of the at least one first vectorial representation. With such feedback, the data mapping system 300 learns over a period of time to improve accuracy of mapping. Additionally, in one or more example embodiments, the data mapping engine 304 creates the one or more reports using the textual equivalent of the at least one first vectorial representation. That is, the data mapping engine 304 considers textual equivalents and information fetched from the database to create the one or more reports. Such reports are then often provided to appropriate compliance authorities in a timely manner.

Figure 4:
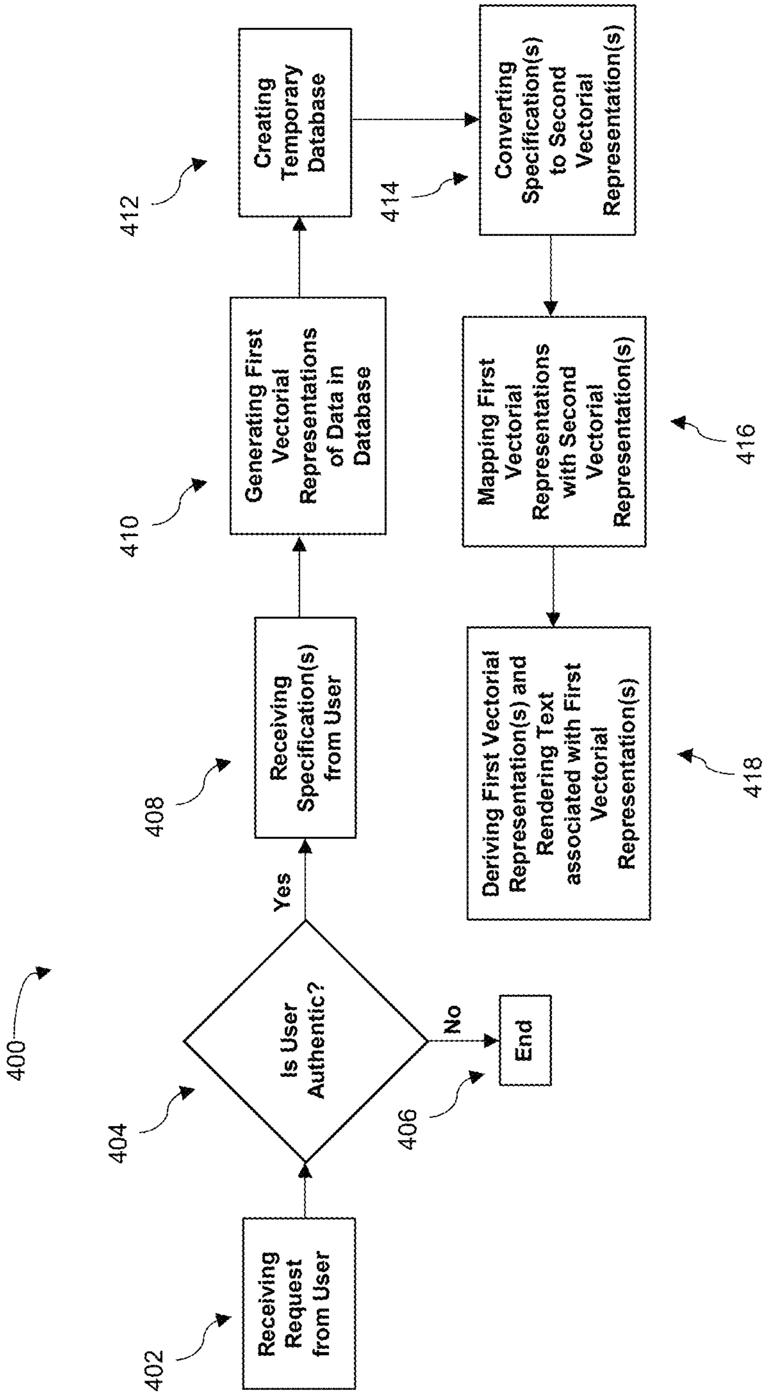
FIG. 4 illustrates a schematic diagram showing an exemplary block diagram associated with one or more operations of exemplary data mapping system, in accordance with one or more example embodiments described herein.

FIG. 4 illustrates a schematic diagram showing an exemplary block diagram associated with one or more operations of exemplary data mapping system, in accordance with one or more example embodiments described herein. In this regard, the block diagram 400 described herein illustrates a flow of the one or more operations performed by the data mapping system 300 described in accordance with FIG. 3 of the current disclosure. In some example embodiments, the block diagram 400 may correspond to an example implementation of the data mapping system 300. At block 402, the data processing module 302 described herein receives a request from a user to access data associated with the facility as described in FIG. 3 of the current disclosure. At block 404, the data processing module 302 verifies if the user is authentic or legit to access the data associated with the facility as described in FIG. 3 of the current disclosure. In case that the user is authentic, the flow proceeds to block 408 whereas if the user is not authentic, the flow ends at block 406. At block 408, the data processing module 302 receives specification(s) from the user who is deemed to be legit as described in FIG. 3 of the current disclosure. These specification(s) relate to parameter(s) associated with at least one product and/or at least one process of the facility. Upon receiving such specification(s), at block 410, the data processing module 302 generates first vectorial representations considering the data associated with the facility which is stored say, in a database. The data processing module 302 may generate the first vectorial representations of selective data associated with the facility in view of the specification (s) received from the user. Then, at block 412, the data processing module 302 creates a temporary database using the first vectorial representations in a manner as described in FIG. 3 of the current disclosure. Whereas at block 414, the data processing module 302 converts the specification(s) into second vectorial representation(s) as described in FIG. 3 of the current disclosure. At block 416, the data mapping engine 304 maps the first vectorial representations with the second vectorial representation(s) in a manner as described in FIG. 3 of the current disclosure. Further, at block 418, the data mapping engine 304 derives first vectorial representation(s) from the temporary database and renders text associated with the first vectorial representation(s) via the user interface 306.

Figure 5:
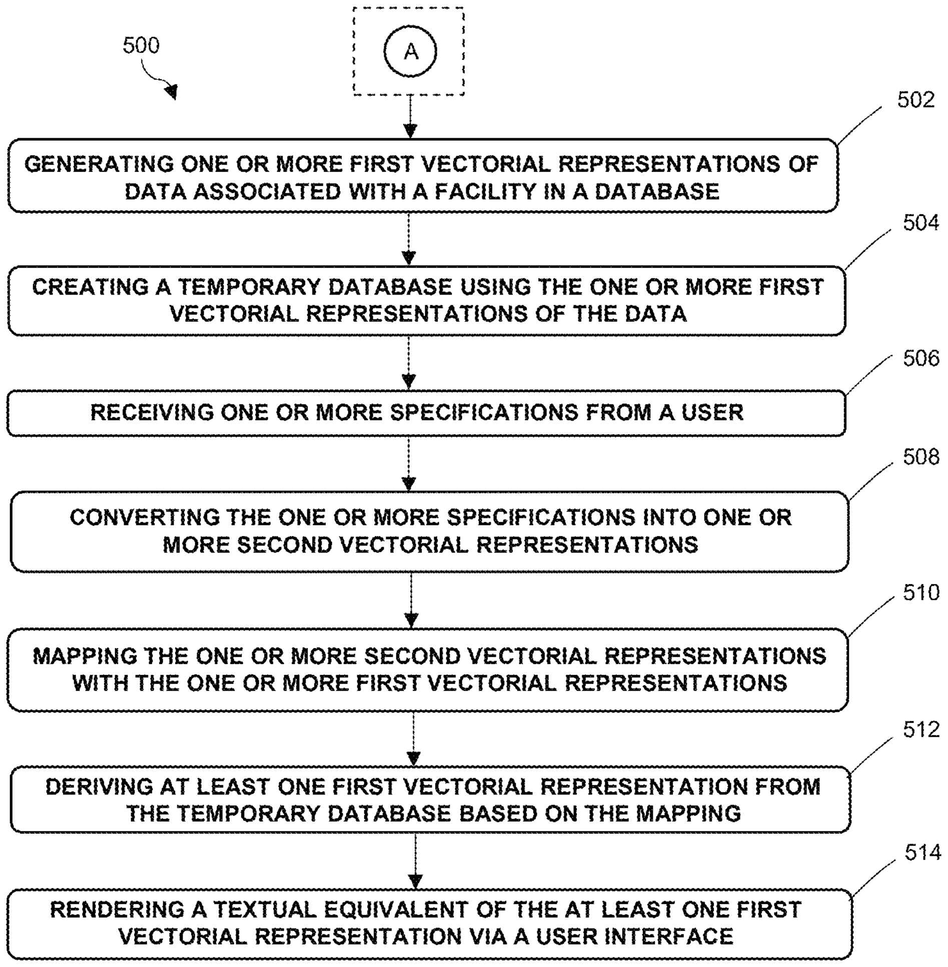
FIG. 5 illustrates a flowchart showing a method described in accordance with one or more example embodiments described herein.

FIG. 5 illustrates a flowchart showing a method described in accordance with one or more example embodiments described herein. In this regard, FIG. 5 illustrates operations that may be performed by the data mapping system 300. In some embodiments, the example method 500 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 500. At step 502 of the exemplary flowchart 500, the data mapping system 300 comprises means such as, the data processing module 302 to generate one or more first vectorial representations of data associated with a facility in a database. At step 504 of the exemplary flowchart 500, the data mapping system 300 comprises means such as, the data processing module 302 to create a temporary database using the one or more first vectorial representations of the data. At step 506 of the exemplary flowchart 500, the data mapping system 300 comprises means such as, the data processing module 302 to receive one or more specifications from a user. The one or more specifications relate to one or more parameters associated with at least one product of the facility. At step 508 of the exemplary flowchart 500, the data mapping system 300 comprises means such as, the data processing module 302 to convert the one or more specifications into one or more second vectorial representations. At step 510 of the exemplary flowchart 500, the data mapping system 300 comprises means such as, the data mapping engine 304 to map the one or more second vectorial representations with the one or more first vectorial representations. At step 512 of the exemplary flowchart 500, the data mapping system 300 comprises means such as, the data mapping engine 304 to derive at least one first vectorial representation from the temporary database based on the mapping. At step 514 of the exemplary flowchart 500, the data mapping system 300 comprises means such as, the user interface 306 to render a textual equivalent of the at least one first vectorial representation.

Figure 6:
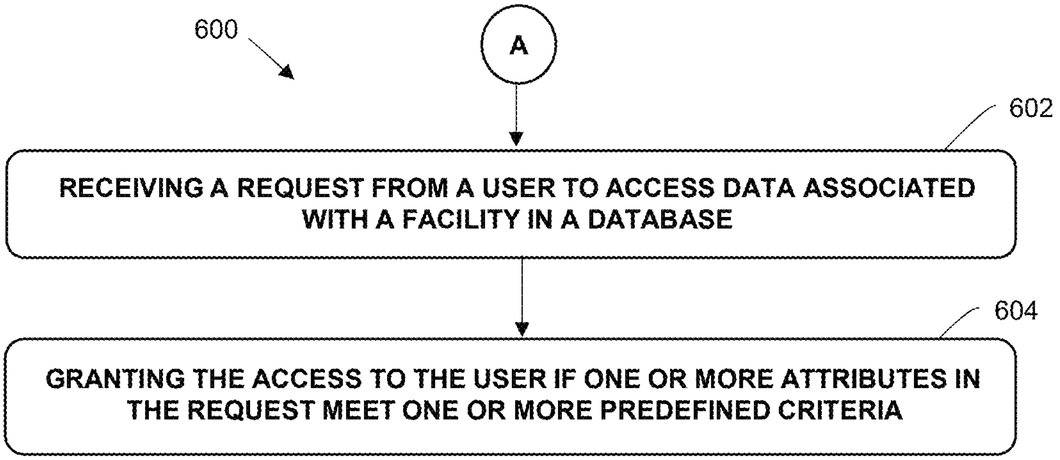
FIG. 6 illustrates a flowchart showing a method described in accordance with one or more example embodiments described herein.

FIG. 6 illustrates a flowchart showing a method described in accordance with one or more example embodiments described herein. In this regard, FIG. 6 illustrates operations that may be performed by the data mapping system 300. In some embodiments, the example method 600 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 600. At step 602 of the exemplary flowchart 600, the data mapping system 300 comprises means such as, the data processing module 302 to receives a request from a user to access data associated with a facility in a database. Then, at step 604 of the exemplary flowchart 600, the data mapping system 300 comprises means such as, the data processing module 302 to grants the access to the user if one or more attributes in the request meet one or more predefined criteria. In this regard, the one or more attributes comprise at least one of a role of the user and an organization with which the user is associated.

The foregoing embodiments are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation. It is intended that the specification and examples be considered as exemplary only, with a true scope and spirit of the disclosure being indicated by the following claims.

The invention claimed is:

1. A method for semantically mapping data associated with a facility, the method comprising:

generating one or more first vectorial representations of the data associated with the facility in a database, wherein the one or more first vectorial representations comprising a numerical equivalent of one or more data records, and wherein the one or more first vectorial representations are generated by converting one or more textual representations in respective data records to one or more numerical representations based on metadata of the one or more data records in the database along with schemas of the one or more data records and the database;

creating a temporary database using the one or more first vectorial representations of the data;

receiving one or more specifications from a user, wherein the one or more specifications relate to one or more parameters associated with at least one product of the facility;

converting the one or more specifications into one or more second vectorial representations;

mapping the one or more second vectorial representations with the one or more first vectorial representations based at least on feedback provided by the user for one or more historical textual equivalents;

deriving at least one first vectorial representation from the temporary database based on the mapping;

rendering a textual equivalent of the at least one first vectorial representation via a user interface;

automatically creating one or more reports using the textual equivalent of the at least one first vectorial representation; and transmit the one or more reports to the user for quality review of the at least one product of the facility.

2. The method of claim 1, further comprising:

receiving a request from the user to access the data associated with the facility in the database; and granting the access to the user if one or more attributes in the request meet one or more predefined criteria, wherein the one or more attributes comprise at least one of a role of the user and an organization with which the user is associated.

3. The method of claim 1, wherein receiving the one or more specifications from the user comprises receiving the one or more parameters related to the at least one product, wherein the one or more parameters comprise at least one of a product identifier, a product name, a process name, a product recall status, a geographical location, a supply chain status of the at least one product, a complaint associated with the at least one product, and a category of the at least one product.

4. The method of claim 1, wherein mapping the one or more second vectorial representations with the one or more first vectorial representations comprises mapping a first vectorial representation with a corresponding second vectorial representation based on metadata of one or more data records in the database along with schemas of the one or more data records and the database.

5. The method of claim 1, further comprising receiving feedback from the user for the textual equivalent of the at least one first vectorial representation rendered via the user interface.

6. A system for semantically mapping data associated with a facility, the system comprising:

a processor;

a memory communicatively coupled to the processor, wherein the memory comprises one or more instructions which when executed by the processor, cause the processor to:

generate one or more first vectorial representations of the data associated with the facility in a database, wherein the one or more first vectorial representations comprise a numerical equivalent of one or more data records, and wherein the one or more first vectorial representations are generated by converting one or more textual representations in respective data records to one or more numerical representations based on metadata of the one or more data records in the database along with schemas of the one or more data records and the database;

create a temporary database using the one or more first vectorial representations of the data;

receive one or more specifications from a user, wherein the one or more specifications relate to one or more parameters associated with at least one product of the facility;

convert the one or more specifications into one or more second vectorial representations;

map the one or more second vectorial representations with the one or more first vectorial representations based at least on feedback provided by the user for one or more historical textual equivalents;

derive at least one first vectorial representation from the temporary database based on the mapping;

render a textual equivalent of the at least one first vectorial representation via a user interface;

automatically creating one or more reports using the textual equivalent of the at least one first vectorial representation; and transmit the one or more reports to the user for quality review of the at least one product of the facility.

7. The system of claim 6, wherein the processor is further configured to:

receive a request from the user to access the data associated with the facility in the database; and grant the access to the user if one or more attributes in the request meet one or more predefined criteria, wherein the one or more attributes comprise at least one of a role of the user and an organization with which the user is associated.

8. The system of claim 6, wherein the processor is further configured to receive the one or more parameters related to the at least one product, wherein the one or more parameters comprise at least one of a product identifier, a product name, a process name, a product recall status, a geographical location, a supply chain status of the at least one product, a complaint associated with the at least one product, and a category of the at least one product.

9. The system of claim 6, wherein the processor is further configured to map a first vectorial representation with a corresponding second vectorial representation based on metadata of one or more data records in the database along with schemas of the one or more data records and the database.

10. The system of claim 6, wherein the processor is further configured to receive feedback from the user for the textual equivalent of the at least one first vectorial representation rendered via the user interface.

11. A non-transitory, computer-readable storage medium having stored thereon executable instructions that, when executed by one or more processors, cause the one or more processors to:

generate one or more first vectorial representations of data associated with a facility in a database, wherein the one or more first vectorial representations comprise a numerical equivalent of one or more data records, and wherein the one or more first vectorial representations are generated by converting one or more textual representations in respective data records to one or more numerical representations based on metadata of the one or more data records in the database along with schemas of the one or more data records and the database;

create a temporary database using the one or more first vectorial representations of the data;

receive one or more specifications from a user, wherein the one or more specifications relate to one or more parameters associated with at least one product of the facility;

convert the one or more specifications into one or more second vectorial representations;

map the one or more second vectorial representations with the one or more first vectorial representations based at least on feedback provided by the user for one or more historical textual equivalents;

derive at least one first vectorial representation from the temporary database based on the mapping;

render a textual equivalent of the at least one first vectorial representation via a user interface;

automatically create one or more reports using the textual equivalent of the at least one first vectorial representation; and send the one or more reports to the user for quality review of the at least one product of the facility.

12. The non-transitory, computer-readable storage medium of claim 11, wherein the one or more processors is further configured to:

receive a request from the user to access the data associated with the facility in the database; and grant the access to the user if one or more attributes in the request meet one or more predefined criteria, wherein the one or more attributes comprise at least one of a role of the user and an organization with which the user is associated.

13. The non-transitory, computer-readable storage medium of claim 11, wherein the one or more processors is further configured to receive the one or more parameters related to the at least one product, wherein the one or more parameters comprise at least one of a product identifier, a product name, a process name, a product recall status, a geographical location, a supply chain status of the at least one product, a complaint associated with the at least one product, and a category of the at least one product.

14. The non-transitory, computer-readable storage medium of claim 11, wherein the one or more processors is further configured to map a first vectorial representation with a corresponding second vectorial representation based on metadata of one or more data records in the database along with schemas of the one or more data records and the database.

15. The non-transitory, computer-readable storage medium of claim 11, wherein the one or more processors is further configured to receive feedback from the user for the textual equivalent of the at least one first vectorial representation rendered via the user interface.

* * * * *